United States Patent [19]

Cagliero

[11] 4,093,746
[45] June 6, 1978

[54] METHOD OF AND FODDER FOR REARING WHITE-MEAT CALVES FOR SLAUGHTER

[75] Inventor: Germano Cagliero, Ivrea (Turin), Italy

[73] Assignee: Marxer S.p.A., Turin, Italy

[21] Appl. No.: 785,515

[22] Filed: Apr. 7, 1977

[30] Foreign Application Priority Data

Apr. 23, 1976 Italy .................... 67991 A/76

[51] Int. Cl.² ............................................. A23K 1/00
[52] U.S. Cl. .................................... 426/2; 426/580; 426/588; 426/807
[58] Field of Search ............ 426/2, 807, 580, 588; 424/285; 542/408

[56] References Cited

U.S. PATENT DOCUMENTS 3,290,213  12/1966  Carron .................... 542/408

FOREIGN PATENT DOCUMENTS 1,327,840  4/1963  France .................... 424/285

*Primary Examiner*—R. B. Penland
*Attorney, Agent, or Firm*—Biebel, French & Nauman

[57] ABSTRACT

Rearing of white-meat calves is accomplished by systematically nourishing the animals with a reconstituted milk containing 40 to 60 ppm nifuroxazide (on a dry weight basis). The optimal dose is about 50 ppm.

4 Claims, No Drawings

METHOD OF AND FODDER FOR REARING WHITE-MEAT CALVES FOR SLAUGHTER

The present invention concerns the rearing of white-meat calves for slaughter.

It has been found that the use of nifuroxazide as auxinic in the rearing of white-meat calves for slaughter allows both the attainment of weight increases hitherto never realized and appreciable saving on the consumed fodder, the latter basically consisting of a known composition based on reconstituted milk.

Therefore one object of the present invention is a method of rearing the calves in question, characterized by systematically nourishing the calves with reconstituted milk containing 40–60 ppm of nifuroxazide (based on the dry content of the milk).

Another object of the present invention is a reconstituted milk composition containing 40–60 ppm of nifuroxazide uniformly dispersed therein. Preferably the nifuroxazide content is substantially 50 ppm.

Nifuroxazide, also known as 5′-nitrofurfurylidene-4-hydroxybenzohydrazide, presents the chemical formula:

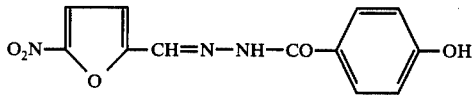

The substance is a microcrystalline, odorless, tasteless, lemon-yellow colored powder, M.P.296°–229° C (with decomposition). It is insoluble in water, ethyl ether and chloroform, soluble in dimethylformamide, scantly soluble in 95% ethanol, in methanol, acetone and ethyl acetate. It is a furan derivative. Furan derivatives find application in veterinary medicine. In particular, according to some studies, it seems that meat animals affected by diarrhea can be cured with relatively high doses of nifuroxazide amounting to at least 600 ppm and normally ranging around 800 ppm (as referred to the fodder).

(In the present specification, parts and percentages are intended by weight, unless they are expressly indicated differently).

The therapy consists in administering to the animals for a few days during illness a fodder containing the hereinbefore indicated doses of nitrofuroxazide.

The present invention is based on the discovery that nifuroxazide acts as auxinic when it is administered to calves in small doses, as hereinbefore indicated, 10–15 times lower than the antidiarrheic doses, practically for the whole rearing period or at least for the largest part of it. It is not a cure for sick animals (affected by diarrhea), but rather a systematic nourishing of healthy animals.

In the past furazolidone was used as auxinis in meat animal-rearing. However, as it will be seen later on, nifuroxazide leads to better results and presents the extremely relevant advantages of not being absorbed by the organism of the animal, and of being deprived of acute and chronic toxicity and of teratogenous activity even if administered in doses twice as great as the therapeutical doses, that is in doses 20–30 times greater than the doses envisaged by the present invention.

PRACTICAL APPLICATION

Tests described later on, have been performed on 104 male calves of the Frisona stock having an average weight of about 56 kg, which have been divided, according to rigid statistical criteria, into four groups of 26 subjects each, said groups being indicated hereinafter by numerals from 1 to 4.

The rearing was carried on for 120 days with the "on battery" system in single wooden stalls. All the animals were systematically fed (two daily meals at fixed hours) with reconstituted milk, whose composition and chemical analysis are indicated in Tables 1 and 2 respectively.

Group 1 was considered as control group. Group 2 was nourished with reconstituted milk admixed with 50 ppm furazolidone.

Nifuroxazide was added to the milk for Group 3 in the ratio of 50 ppm during the first 60 days only of rearing.

Finally, 50 ppm of nifuroxazide were added to the milk for Group 4 for the entire period of rearing.

The two furan derivatives were added in the form of pre-mixtures with lactose at 0.5% concentration in order to favour the distribution uniformity in the dry milk stock.

Feeding was carried on according to conventional technique which plans a progressive passage from an amount of about 500 g of milk powder per day for each calf at the beginning of the rearing, up to a maximum daily diet of 2,500–2,700 g, starting when the animal is 3-months old. Water for the dilution of the powdered milk was drawn from a well of a depth of 90 m. Starting from the 71.st day of rearing, this water was de-ironized and softened by means of a conventional ion-exchange apparatus.

The individual consumption of milk was controlled every day. Control of the weight of the animals was always made after a 12 hour period of fasting (practically at the same hour in the morning).

The results obtained are summarized in Tables 3, 4 and 5.

Table 3 shows that, with respect to control Group 1, Group 2 has marked at the end of rearing an average weight increase higher than 8.33 kg, while Group 4 (50 ppm of nifuroxazide) has realized an advantage of 17.81 kg, that is more than double that obtained with furazolidone. Besides from Table 3 it can be noticed that, after the interruption in the nifuroxazide administration, Group 3 was still in advantage with respect to Groups 1 and 2 for another month, whereupon however a slower growth occured, slightly higher than that of control Group 1. Identical conclusions may be drawn from Table 4.

From Table 5 it can be noticed that the administration of furazolidone brings forth a certain saving (about 4%) on the fodder in comparison with control Group 1. However it also turns out that the saving attained with the administration of nifuroxazide (Group 4) amounts to 9.7% with respect to Group 1, that is, it is more than twice as great as that attained with furazolidone.

TABLE 1

| (Composition of re-constituted milk) | |
|---|---|
| Ingredient | % |
| Skim milk powder (spray) | 70.000 |
| Fat (1) | 18.000 |
| Dextrose | 6.000 |
| Corn starch | 3.000 |
| Soy lecithin | 1.000 |

TABLE 1-continued

| (Composition of re-constituted milk) | |
|---|---|
| Ingredient | % |
| Vitamin integrator (2) | 1.000 |
| Di-calcium phosphate | 0.400 |
| Sodium chloride | 0.300 |
| Sucrose esthers | 0.285 |
| Flavouring | 0.015 |

(1) Fat is represented by bovine tallow, lard palm oil and cocoanut oil in equal parts.
(2) Composition of the vitamin complex (per kg): Vit.A: I.U. 2.700.000; Vit.D$_3$: I.U. 700.000; Vit.E; mg 2.500; Vit.B$_1$: mg 600; Vit.B$_2$: mg 500; Vit.B$_6$: mg 200; Vit.B$_{12}$: mg 5; Vit.K: mg 2.500; Vit.PP: mg 5.000; DL-methionine: mg 30.000; Lysine: mg 20.000; support q.s. to g 1,000.

TABLE 2

| (Chemical anaysis of reconstituted milk) | | |
|---|---|---|
| Humidity | % | 4.86 |
| Ashes | % | 0.10 |
| Raw protein | % | 25.43 |
| Raw fat | % | 10.18 |
| Raw fiber | % | 0.15 |
| Non-nitrogeneous extracts) | % | 44.26 |

TABLE 3

| | (Weight increase) | | | |
|---|---|---|---|---|
| Month | 1 control | 50 ppm Group 2 furazolidone | 50 ppm (60 days) 3 nifuroxazide | 50 ppm (entire rearing period) 4 |
| Initial average weight | 56.88 | 56.98 | 56.88 | 56.98 |
| 1.st month | 80.78 | 80.74 | 85.05 | 85.24 |
| 2.nd month | 118.70 | 120.37 | 124.80 | 126.13 |
| 3.rd month | 159.02 | 164.77 | 165.24 | 171.13 |
| 4.th month | 204.44 | 212.77 | 207.84 | 222.25 |
| Difference with respect to Group 1 (kg) | — | +8.33 | +3.40 | +17.81 |

TABLE 4

| | (Daily weight increases) | | | |
|---|---|---|---|---|
| Period | Groups 1 | 2 | 3 | 4 |
| 1.st month (kg) | 0.800 | 0.792 | 0.939 | 0.942 |
| 2.nd month (kg) | 1.264 | 1.321 | 1.325 | 1.363 |
| 3.rd month (kg) | 1.344 | 1.480 | 1.348 | 1.500 |
| 4.th month (kg) | 1.514 | 1.600 | 1.420 | 1.704 |
| Average increase/day (kg) | 1.234 | 1.300 | 1.259 | 1.375 |

TABLE 5

| | (kg milk consumed per kg weight produced) | | | |
|---|---|---|---|---|
| | Group | | | |
| Month | 1 | 2 | 3 | 4 |
| 1° | 1.356 | 1.340 | 1.187 | 1.152 |
| 2° | 1.294 | 1.270 | 1.234 | 1.201 |
| 3° | 1.617 | 1.584 | 1.612 | 1.509 |
| 4° | 1.677 | 1.600 | 1.691 | 1.490 |
| Average | 1.511 | 1.450 | 1.462 | 1.364 |

TOXICOLOGICAL TESTS

A wide toxicological study on nifuroxazide has been performed at the Virology and Immunology Laboratory of the Pharmacy Faculty of Paris, France.

As regards the acute toxicity it has been demonstrated that 4 g/kg in the rats do not cause death and 8 g/kg kill only 30% of the animals. Besides it can be stated that this 30% mortality is not due to the furanic compound as such but to the mechanical action of the large amount of ingested substance.

In the determination of chronic toxicity, always in the rat, with a dose of 100 mg/kg of nifuroxazide for a period of 20 days it has not been possible to detect at the necroscopic examination either macroscopical or histological lesions.

Besides, nifuroxazide administered daily for 6 months to "Rhesus" monkeys and to "Wistar" rats at the dose of 10-250-1000 mg/kg has not determined any toxicity symptom.

A toxicologic study on chickens and rabbits has been performed at the Institute of General Pathology and Veterinary Pathologic Anatomy of Turin, Italy.

As regards the acute toxicity, none of the chickens treated with a 2 g/kg dose of nifuroxazide died; the necroscopic examination has not detected macroscopic or histological lesions.

No cases of death occurred even in the chronic toxicity tests performed for four months and for 6 months by administration with the feed in a dosage respectively 15 times and 16 times greater than the therapeutical one.

The residue control tests performed on the organs of chickens treated for 5 days with 10 and 20 mg/kg respectively of nifuroxazide (therapuetical- and twice the therapeutical dose) showed negative results.

On the acute toxicity tests performed on rabbits of the New Zealand stock, probed for 4 days with 5 g/kg of nifuroxazide, all the subjects survived without displaying any particular symptomatology.

Besides, administration of nifuroxazide incorporated in the ratio of 1% in the diet of rabbits of the white neozealandese stock for the duration of three months did not cause occurrence of any particular symptomatology.

The hematological and hematochemical examinations of the percentage weight of the organs and the necroscopic and anatomo-pathological examination, did not detect any particular alteration related to the treatment.

TERATOGENETICAL TESTS

This study was performed at the Consultox Laboratories of London on 90 rabbits of the Dutch Belted stock and on 150 mice of the Charles River stock.

Nifuroxazide administered to rabbits from the 6.th to the 18.th day of pregnancy at the dose of 250-500-1,000 mg/kg and to mice from the 6.th to the 15.th day of pregnancy at the dose of 500-1,000-2,000 mg/kg did not exhibit any teratogenous activity.

PHARMACOKINETICAL STUDY

This study was performed at the Pharmacy Faculty of Paris, France, by the following methodologies:
   determination of nifuroxazide in the intestine after a certain period from its administration, sufficient to allow its passage into the blood, determination in the blood at different time intervals from the administration.

The first experiment consists of introducing into the small intestine of anesthesized rat an exact amount of nifuroxazide, through a small incision at the duodenum region. After a certain period of time (5 hours), in relation to the normal duration of the intestinal transit, the amount remaining in the intestine is determined.

Having treated 5 animals in the hereinbefore mentioned way the following results have been obtained:

|  | Amount of nifuroxazide | | |
|---|---|---|---|
|  | Administered | Found | % Found |
|  | 66 mg | 67 mg | 101.3 |
|  | 67 mg | 64 mg | 95.5 |
|  | 52.5 mg | 50 mg | 95.2 |
|  | 65 mg | 66.5 mg | 102.2 |
|  | 62 mg | 64 mg | 103 |
| Average | 62.5 mg | 62.3 mg | 99.4 |

The results show that, taking into account any errors made during the experiment and the sensitivity of the method, practically all the nifuroxazide which has been introduced is found again in the intestine, even after 5 hours.

Rats weighing 150–180 g treated with 1 ml of a 10% suspensions of nifuroxazide (100 mg) have been used for the search of nifuroxazide in the blood; blood samples were taken from the rats 1 hr, 2 hrs and 3 hrs after administration of the compound. Notwithstanding this maximum dosage, it has not been possible to evidence the presence of nifuroxazide in the blood of these animals by a method which allows detection of a concentration as low as 1 $\mu$g/ml.

Further experiments performed on the blood of dogs treated orally with massive doses of nifuroxazide (200 mg/kg), as well as on the blood of subjects treated with doses slightly greater than the usual therapeutical doses, have given negative results, even though the analytical method allowed detection of a hematical concentration of nifuroxazide of 0.4 mg/ml.

Nifuroxazide kinetics is therefore limited to an intestinal transit with no absorption.

I claim:

1. Method of increasing the growth rate of white-meat calves for slaughter, comprising systematically feeding the calves with reconstituted milk containing 40–60 ppm of nifuroxazide on a dry weight basis for substantially the entire period of growth.

2. Method according to claim 1, wherein the nifuroxazide proportion is 50 ppm.

3. A reconstituted milk for rearing white-meat calves for slaughter, containing 40–60 ppm of nifuroxazide on a dry weight basis.

4. A reconstituted milk according to claim 3, containing 50 ppm of nifuroxazide.

* * * * *